United States Patent [19]
Jinbo et al.

[11] Patent Number: 5,886,623
[45] Date of Patent: Mar. 23, 1999

[54] BICYCLE DISPLAY DEVICE WHICH DISPLAYS TIRE INFORMATION

[75] Inventors: Masahiko Jinbo, Minamikawachi-gun; Hitoshi Kishimoto, Sakai, both of Japan

[73] Assignee: Shimano, Inc., Osaka, Japan

[21] Appl. No.: 991,263

[22] Filed: Dec. 16, 1997

[30] Foreign Application Priority Data

Dec. 19, 1996 [JP] Japan ................................. 8-354343

[51] Int. Cl.$^6$ ....................................................... B62J 3/00
[52] U.S. Cl. ........................... 340/432; 340/525; 324/160
[58] Field of Search ................................... 340/432, 427, 340/461, 525; 324/166, 160, 174; 364/709.01, 709.02

[56] References Cited

U.S. PATENT DOCUMENTS

| | | | |
|---|---|---|---|
| 4,434,801 | 3/1984 | Jiminez et al. | 128/689 |
| 4,633,216 | 12/1986 | Tsuyama | 340/134 |
| 4,636,769 | 1/1987 | Tsuyama | 340/134 |
| 4,642,606 | 2/1987 | Tsuyama | 340/134 |
| 4,859,984 | 8/1989 | Romano | 340/432 |
| 4,887,249 | 12/1989 | Thinesen | 368/10 |
| 5,335,188 | 8/1994 | Brisson | 340/432 |
| 5,497,143 | 3/1996 | Matsuo et al. | 340/432 |
| 5,629,668 | 5/1997 | Downs | 340/532 |
| 5,644,511 | 7/1997 | McWhorter | 364/565 |

*Primary Examiner*—Thomas Mullen
*Assistant Examiner*—Anh La
*Attorney, Agent, or Firm*—James A. Deland

[57] ABSTRACT

A display device for a bicycle includes a memory for storing a plurality of tire circumference values and a plurality of tire designation values; display means for displaying information, wherein the display means includes tire designation display means for displaying tire designation information corresponding to the plurality of tire designation values; control means for controlling the information displayed on the display means; and input means for inputting commands to the control means. The display means may include tire circumference display means for displaying tire circumference information corresponding to the plurality of tire circumference values simultaneously with the tire designation information displayed by the tire designation display means. The display may further include correction storing means for storing a plurality of correction values and correction display means for displaying a plurality of correction information corresponding to the plurality of correction values. In this case the control means includes means for selecting one of the plurality of the correction information displayed by the display means so that the correction information may be used to adjust the value of a selected tire circumference.

16 Claims, 3 Drawing Sheets

| TIRE CIRCUMFERENCE | TIRE DESIGNATION | TIRE CIRCUMFERENCE | TIRE DESIGNATION |
|---|---|---|---|
| 178.5 | 24 3-4 | 210.0 | 26 1 1-2 |
| 179.0 | 24 1.00 | 210.5 | 650 38.8 |
| 189.0 | 24 1 3-4 | 211.0 | 700 20 |
| 190.5 | 24 1 1-4 | 211.5 | 700 25 |
| 192.5 | 24 2.00 | 212.5 | 650 38A |
| 196.5 | 24 2 1-8 | 213.0 | 700 C |
| 197.0 | 26 1.00 | 213.5 | 700 28 |
| 200.5 | 26 1.40 | 214.0 | 27 1.00 |
| 203.0 | 26 1.50 | 215.5 | 700 32 |
| 205.0 | 26 1.75 | 216.0 | 27 1 1-8 |
| 207.0 | 700 18 | 217.0 | 700 30 |
| 207.5 | 26 1 3-8 | 218.0 | 27 1 1-4 |
| 208.5 | 26 2.00 | 221.0 | 27 1 3-8 |
| 209.0 | 700 19 | 226.0 | 26 2 1-8 |

FIG. 3

BICYCLE DISPLAY DEVICE WHICH DISPLAYS TIRE INFORMATION

BACKGROUND OF THE INVENTION

The present invention is directed to a bicycle display device that displays various types of data such as the bicycle velocity and distance traveled, wherein the tire circumference can be simply, accurately, and reliably input.

Display devices for displaying various types of bicycle-related data, such as the bicycle velocity, distance traveled, and shift position of the shifter, are commonly mounted on bicycles. Of such data, the bicycle velocity and the distance traveled are important. Because a sensor monitors the wheel rotation, knowledge of the tire circumference is essential for displaying the bicycle velocity and the distance traveled. Thus, when a display device is attached to a bicycle, the circumference of the bicycle tires must be set up in the display device as an initial setting. Methods for establishing the tire circumference include inputting the tire outside diameter to calculate the nominal value for the tire circumference based on the outside diameter, or measuring the tire outer periphery and directly inputting the actual measured value.

Unfortunately, it is not possible to cover all types of operating conditions of the tire when calculating the nominal value for the circumference of the tire by inputting the outside diameter of the tire. For example, when the rider is mounted on the bicycle, the tire circumference deviates from the nominal value depending on the tire air pressure, the body weight of the rider, and the type of tire. That is because the tire is deformed by the body weight of the rider, and the extent of deformation is related to a variety of parameters, such as the tire outside diameter, width, structure, and type of rubber, thus making it impossible to ensure accurate measurement of the extent of deformation using just the outside diameter of the tire. The tire circumference thus cannot be accurately set merely by inputting the outside diameter of the tire.

When the tire circumference is measured while the rider is mounted on the bicycle, the accurate measurement of the tire circumference is complicated and cannot be readily managed by the rider. Differences in the set values also occur, despite deliberate attempts to make accurate measurements, because of deviation in the tire air pressure from that at the time of measurement, differences in the body weight of riders, and so forth.

SUMMARY OF THE INVENTION

The present invention is directed to a bicycle computer display device which provides information that enables the rider to more quickly and accurately input tire circumference data into the computer, including correction information which accommodates variations in the tire circumference caused by air pressure, body weight of the rider, and so forth. In one embodiment of the present invention, a display device for a bicycle includes a memory for storing a plurality of tire circumference values and a plurality of tire designation values; display means for displaying information, wherein the display means includes tire designation display means for displaying tire designation information corresponding to the plurality of tire designation values; control means for controlling the information displayed on the display means; and input means for inputting commands to the control means. The display means may include tire circumference display means for displaying tire circumference information corresponding to the plurality of tire circumference values simultaneously with the tire designation information displayed by the tire designation display means.

In a more specific embodiment, the control means causes the display means to selectively display tire circumference and designation information in response to commands from the input means. The display may further include correction storing means for storing a plurality of correction values and correction display means for displaying a plurality of correction information corresponding to the plurality of correction values. In this case the control means includes means for selecting one of the plurality of the correction information displayed by the display means so that the correction information may be used to adjust the value of a selected tire circumference.

BRIEF DESCRIPTION OF THE DRAWINGS

FIG. 3 is a table providing tire circumference and designation values.

DETAILED DESCRIPTION OF THE EMBODIMENTS

Figure 1:
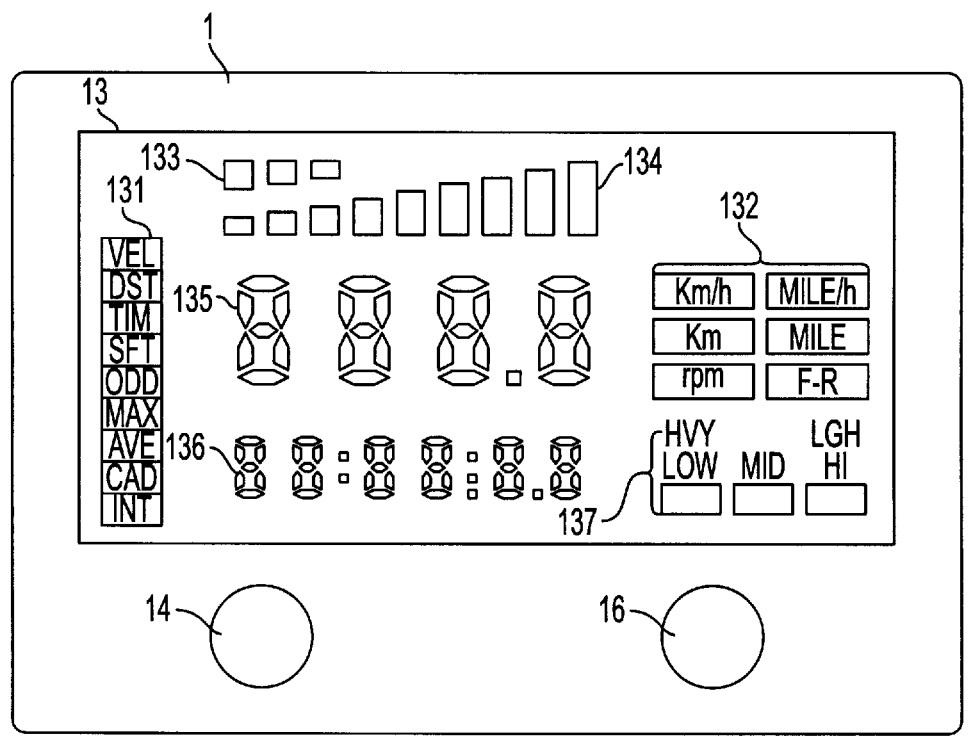
FIG. 1 is front view of a particular embodiment of a bicycle display device according to the present invention.

FIG. 1 is front view of a particular embodiment of a bicycle display device 1 according to the present invention. The display device 1 measures or calculates and displays various types of data such as the bicycle velocity, distance traveled, lap time, crank spindle speed, and change gear shift position, and it is set up in a location such as in the center of the bicycle handlebar so as to be readily seen by the rider. The display device 1 is provided with a display means 13 which displays various essential display elements 131 through 137. A liquid crystal display panel, light-emitting diode, or the like can be used as the display means 13.

The display 131 indicates the contents of a main numerical value display 135 and an auxiliary numerical value display 136. For example, VEL indicates the display of running velocity, DST running distance or calculated distance, TIM time or running time, and SFT change gear shift position. The velocity units can be switched between Kmh and Mph, and the distance units can be switched between kilometers and miles. The unit display 132 displays units for the numerical values shown on the main numerical value display 135.

The front shift position display 133 shows the shift position for the front change gear device, and the rear shift position display 134 shows the shift position for the rear change gear device. The left and right sides are the high and low speed sides, respectively, for both the front and rear shift positions. The bar corresponding to the current shift position is displayed in a dark color. The correction display 137 sets and displays the amount of correction between the circumference of the tire whose rotation is monitored, that is, the standard value of the tire circumference based on standard air pressure and standard body weight when the tire circumference is set, and the circumference when the rider is actually mounted. The amount of correction can be varied according to the tire air pressure and the body weight of the rider.

The display device 1 is provided with a left mode switch 14 and right mode switch 16 for switching the display of the display means 13 and inputting initial set values. A left-hand mode switch 15 (see FIG. 2) and right-hand mode switch 17 with the same functions as the left mode switch 14 and right mode switch 16 are also provided. The left-hand mode switch 15 may be provided on the left brake lever, and the right-hand mode switch 17 may be provided on the right brake lever. The left mode switch 14 and left-hand mode switch 15 are arranged in parallel, and the same function is executed whichever switch is pressed. The right mode switch 16 and right-hand mode switch 17 are similarly arranged. The left- and right-hand mode switches can be operated to operate the display device 1 without disengaging the hands from the handle grip positions.

Figure 2:
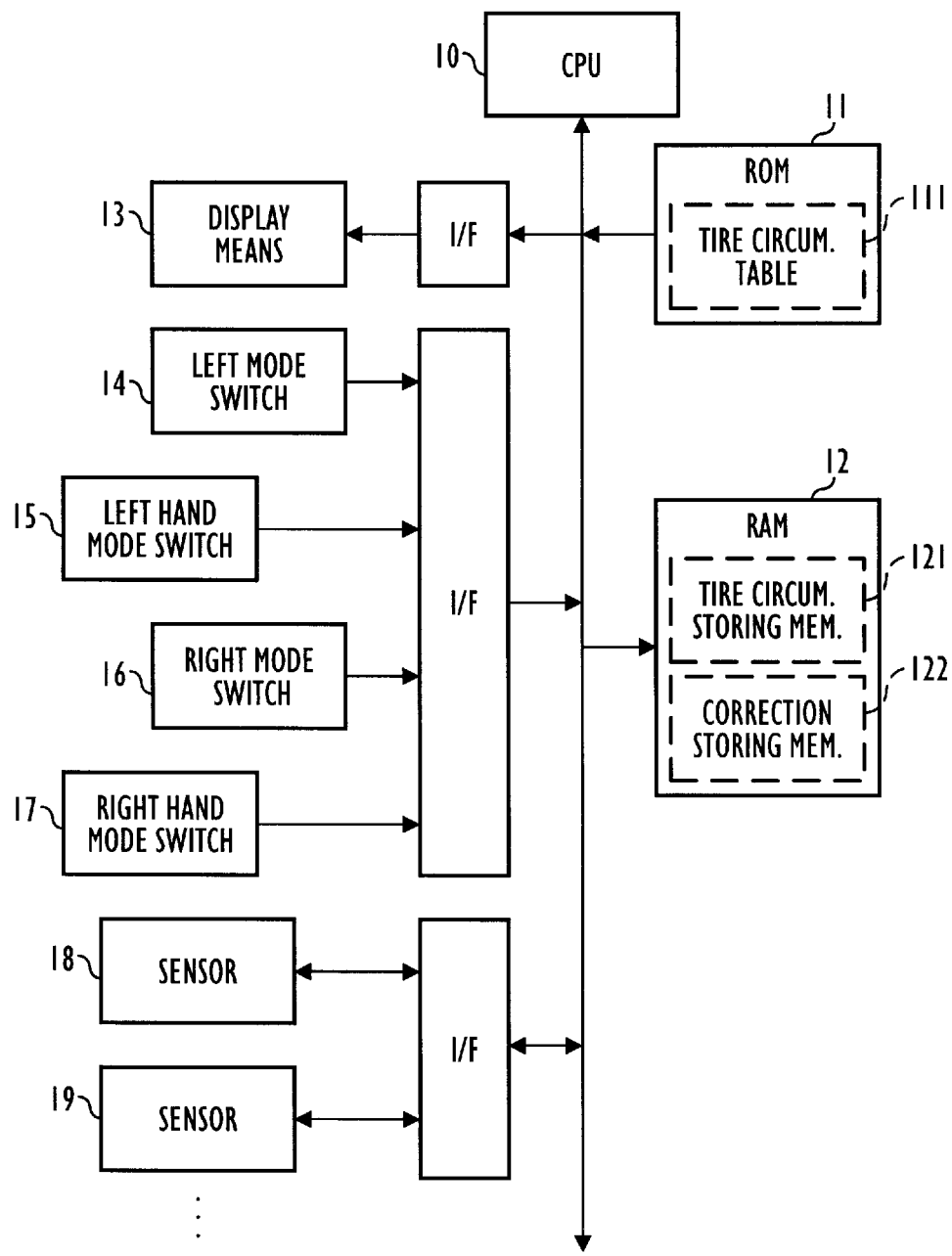
FIG. 2 is a schematic diagram of the computer mechanism included in the display device.

FIG. 2 is a block diagram depicting the circuit structure of the display device 1. The display device 1 is provided with a CPU 10 for data processing. A ROM 11 and RAM 12 are connected as a storing means through a bus to the CPU 10. Data and programs for operating the CPU 10 are stored in the ROM 11 and RAM 12. As data storage means, a tire circumference table 111 (described below) is provided in the ROM 11, while a tire circumference storing memory 121 and correction storing memory 122 are provided in the RAM 12.

The display means 13 is connected through a bus and interface circuit to the CPU 10. The display of the display means 13 is controlled by the CPU 10. The left mode switch 14, left-hand mode switch 15, right mode switch 16, and right-hand mode switch 17 are also connected through the bus and interface circuit to the CPU 10. The CPU 10 detects whether these switches are on or off. Various sensors 18, 19, etc. for monitoring the tire revolutions, crank spindle revolutions, or the like are also connected through the bus and interface circuit. The output from these sensors 18, 19, etc. is processed by the CPU 10.

FIG. 3 depicts the contents of the tire circumference table 111. The tire circumference table 111 is stored in a memory area in the ROM 11, and it matches the tire circumference (cm) and the tire designation identifying the tire. The tire designation is often a combination of a display of outer diameter in inches ("24") or the like and a display of the tire width in inches, but other displays are also used. At any rate, it includes data on the tire outer diameter and tire width. In this embodiment, the measured values obtained when the tire is set to the standard air pressure for that type and a rider of a standard body weight has mounted the bike are used in the data of the tire circumference for the tire designation. The tire circumference is thus set upon consideration of all parameters such as tire outside diameter, width, structure, and rubber type.

The display device 1 is operated in the following manner. When a battery is first set up in the display device 1, values are pre-stored in the tire circumference storing memory 121 and correction storing memory 122, and the main numerical value display 135 and the auxiliary numerical value display 136 are set up to display running velocity and time. When the left mode switch 14 or left on-hand mode switch 15 is pressed a given number of times, the main numerical value display 135 can be sequentially switched to display the distance traveled, shift position number display, maximum velocity, average velocity, or the like.

When the left mode switch 14 and right mode switch 16 are simultaneously pressed, the display 131 displays INT, entering the initial set value input mode. The left mode switch 14 is then pressed to sequentially switch the type of initial set value, so as to switch between kilometer and mile units for distance and velocity, set the tire circumference, set the time, and set the amount of correction of the tire circumference according to the air pressure and body weight. Initially, kilometers and miles are switched, and the current values "Kmh" and "Km" flash, so the right mode switch 16 is operated to flash the set units, and the left mode switch 14 is pressed to determine the value and move on to the next setting.

The time set is as follows. The time is displayed in the auxiliary numerical value display 136, and the time is set to the desired numerical value by the right mode switch 16 as the setting component is sequentially switched by the left mode switch 14 through seconds, minutes, and hours. When all levels have been set and the left mode switch 14 has been pushed, the time set up is concluded, and the process moves on to the set up of the tire circumference correction.

The tire circumference is set as follows. Initially, "175.0" is displayed while flashing in the main numerical value display 135. This displays the tire circumference in centimeters. At the same time "— — —" is initially displayed in the auxiliary numerical display 136. The numerical value displayed in the main numerical value display 135 increases in 0.5 increments every time the right mode switch 16 is pressed. When the numerical value reaches the maximum "230.0," it then returns to the minimum value "175.0." When the numerical value of the main numerical value display 135 agrees with any of the tire circumference values stored in the tire circumference table 111 shown in FIG. 3, the tire designation corresponding to that value is displayed in the auxiliary numerical value display 136. For example, when the main numerical value display 135 shows "178.5," the auxiliary numerical value display 136 shows "24 3–4." Because the tire designation "24 3–4" or the like is displayed on the tire side wall or the like, the rider can determine at a glance by the auxiliary numerical value display 136 whether or not the display corresponds to the tire of the bicycle. If the tire designation corresponding to the bicycle is displayed on the auxiliary numerical value display 136, the left mode switch 14 is pressed to set that value and move on to the next setting. Even with special tires having a tire designation not stored in the tire circumference table 111, the tire circumference can be set on the basis of numerical values in the main numerical value display 135 by measuring the tire circumference in advance. The numerical value thus set for the tire circumference is stored in the tire circumference storing memory 121 in the RAM 12.

When the amount of tire circumference correction is set, the current values (standard body weight and standard air pressure) flash in the "Mid" position of the initial correction display 137. When the body weight is heavy or the air pressure is low, the correction value can be set to "Hvy" and "Low." On the other hand, when the body weight is light or the air pressure is high, the correction value can be set to "Lgh" and "Hi." The amount of tire circumference correction is "–1" when the settings are "Hvy" and "Low," "0" when "Mid," and "+1" when "Lgh" or "Hi." The amount of correction that is set is stored in the correction storing memory 122. The tire circumference used to calculate the running velocity, distance traveled, or the like is calculated on the basis of the sum of the numerical value stored in the tire circumference memory 121 and the amount of correction stored in the correction storing memory 122.

When the initial settings are all complete, the left mode switch 14 and right mode switch 16 are again pressed simultaneously, restoring the display device 1 to normal display mode. The display device 1 can be initialized and the CPU 10 reset by simultaneously pressing the left mode switch 14 and right mode switch 16 for at least 3 seconds.

The tire circumference can thus be set easily, accurately, and reliably by confirming the tire designation on the auxiliary numerical value display 136. Because the tire circumference can also be corrected based on the tire air pressure and the body weight of the rider, there are fewer errors in the numerical values for the tire circumference, resulting in more reliable display of running velocity, distance traveled, and the like.

While the above is a description of various embodiments of the present invention, further modifications may be employed without departing from the spirit and scope of the present invention. For example, the size, shape, location or orientation of the various components may be changed as desired. The functions of one element may be performed by two, and vice versa. In the above embodiment, the correction based on tire air pressure and the body weight of the rider was managed in three stages, but it may also be divided into more stages such as five stages. Correction based on tire air pressure and that based on the body weight of the rider may also be set separately. Although the mode switches and the left- and right-hand mode switches in the display device itself have the same functions, the initial setting input mode may be operated in only the mode switches in order to prevent errors. The mode switches may also be left out of the display device, so that only the on-hand mode switches are used to set the values.

Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A display device for a bicycle comprising:
    a memory (11) for storing a plurality of tire circumference values and a plurality of tire designation values;
    display means (13) for displaying information, wherein the display means includes tire designation display means (136) for displaying tire designation information corresponding to the plurality of tire designation values;
    control means (10) for controlling the information displayed on the display means (13);
    input means (14,15,16,17) for inputting commands to the control means (10); and
    wherein the tire designation information includes a tire diameter value and a tire width value.

2. The display device according to claim 1 wherein each of the plurality of tire circumference values comprises a nominal value of a tire diameter corrected by a selected amount.

3. The display device according to claim 1 wherein the control means (10) causes the display means (13) to selectively display tire designation information in response to commands from the input means (14,15,16,17).

4. The display device according to claim 3 wherein the display means (13) includes tire circumference display means (135) for displaying tire circumference information corresponding to the plurality of tire circumference values simultaneously with the tire designation information displayed by the tire designation display means (136).

5. A display device for a bicycle comprising:
    a memory (11) for storing a plurality of tire circumference values and a plurality of tire designation values;
    display means (13) for displaying information, wherein the display means includes tire designation display means (136) for displaying tire designation information corresponding to the plurality of tire designation values,
    control means (10) for controlling the information displayed on the display means (13);
    input means (14,15,16,17) for inputting commands to the control means (10); and
    correction storing means (122) for storing a plurality of correction values used to correct the circumference values.

6. The display device according to claim 5 wherein the display means (13) includes correction display means (137) for displaying correction information corresponding to the plurality of correction values.

7. The display device according to claim 6 wherein the correction display means (137) displays a plurality of the correction information.

8. A display device for a bicycle comprising:
    a memory (11) for storing a plurality of tire circumference values and a plurality of tire designation values;
    display means (13) for displaying information, wherein the display means includes tire designation display means (136) for displaying tire designation information corresponding to the plurality of tire designation values;
    control means (10) for controlling the information displayed on the display means (13);
    input means (14,15,16,17) for inputting commands to the control means (10);
    wherein the control means (10) causes the display means (13) to selectively display tire designation information in response to commands from the input means (14,15,16,17);
    wherein the display means (13) includes tire circumference display means (135) for displaying tire circumference information corresponding to the plurality of tire circumference values simultaneously with the tire designation information displayed by the tire designation display means (136); and
    wherein the tire designation information includes a tire diameter value and a tire width value.

9. The display device according to claim 8 wherein each of the plurality of tire circumference values comprises a nominal value of a tire diameter corrected by a selected amount.

10. A display device for a bicycle comprising:
    a memory (11) for storing a plurality of tire circumference values and a plurality of tire designation values;
    display means (13) for displaying information, wherein the display means includes tire designation display means (136) for displaying tire designation information corresponding to the plurality of tire designation values;
    control means (10) for controlling the information displayed on the display means (13);
    input means (14,15,16,17) for inputting commands to the control means (10);
    wherein the control means (10) causes the display means (13) to selectively display tire designation information in response to commands from the input means (14,15,16,17); and
    correction storing means (122) for storing a plurality of correction values used to correct the circumference values.

11. The display device according to claim 10 wherein the display means (13) includes correction display means (137) for displaying correction information corresponding to the plurality of correction values.

12. The display device according to claim 11 wherein the correction display means (137) displays a plurality of the correction information.

13. The display device according to claim 12 wherein the control means includes means for selecting one of the plurality of the correction information displayed by the correction display means (137).

14. The display according to claim 13 wherein the display means (13) includes tire circumference display means (135) for displaying tire circumference information corresponding to the plurality of tire circumference values simultaneously with the tire designation information displayed by the tire designation display means (136).

15. The display device according to claim 14 wherein the tire designation information includes a tire diameter value and a tire width value.

16. The display device according to claim 15 wherein each of the plurality of tire circumference values comprises a nominal value of a tire diameter corrected by a selected amount.

* * * * *